(12) United States Patent
Ishimoto

(10) Patent No.: US 7,805,234 B2
(45) Date of Patent: Sep. 28, 2010

(54) VEHICULAR TURNING CONTROL APPARATUS AND METHOD

(75) Inventor: Takeshi Ishimoto, Kanagawa (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1343 days.

(21) Appl. No.: 11/284,084

(22) Filed: Nov. 22, 2005

(65) Prior Publication Data

US 2006/0129300 A1    Jun. 15, 2006

(30) Foreign Application Priority Data

Nov. 29, 2004   (JP) .............................. 2004-344388

(51) Int. Cl.
*B60T 8/24* (2006.01)
(52) U.S. Cl. .......................................... 701/72; 701/70
(58) Field of Classification Search ..................... 701/1, 701/41, 48, 70–80; 303/146–150, 154, 155, 303/160, 166–173, 177, 178, 183, 185
See application file for complete search history.

(56) References Cited

U.S. PATENT DOCUMENTS

| | | | | |
|---|---|---|---|---|
| 4,998,593 A | * | 3/1991 | Karnopp et al. | 180/408 |
| 5,636,909 A | * | 6/1997 | Hirao et al. | 303/140 |
| 5,882,092 A | * | 3/1999 | Koibuchi | 303/146 |
| 6,188,316 B1 | | 2/2001 | Matsuno et al. | |
| 6,317,677 B1 | * | 11/2001 | Monzaki et al. | 701/84 |
| 6,366,844 B1 | | 4/2002 | Woywod et al. | |
| 7,236,870 B2 | | 6/2007 | Tange et al. | |
| 2004/0226768 A1 | * | 11/2004 | DeLuca et al. | 180/275 |

FOREIGN PATENT DOCUMENTS

| | | |
|---|---|---|
| DE | 103 59 393 A1 | 7/2004 |
| EP | 0 656 275 A2 | 6/1995 |
| EP | 1 080 972 A2 | 3/2001 |
| EP | 1 195 303 A2 | 4/2002 |
| JP | 2-171373 (A) | 7/1990 |
| JP | 5-16699 (A) | 1/1993 |
| JP | 02-600876 B2 | 1/1997 |
| JP | 2600876 B2 | 1/1997 |
| JP | 11-255004 (A) | 9/1999 |
| JP | 2000-52950 (A) | 2/2000 |
| JP | 2000-233730 (A) | 8/2000 |
| JP | 2004-142686 (A) | 5/2004 |
| JP | 2004-284484 (A) | 10/2004 |

OTHER PUBLICATIONS

U.S. Appl. No. 11/138,312, filed May 27, 2005, Higuchi.

(Continued)

*Primary Examiner*—Mark Hellner
*Assistant Examiner*—Helal A Algahaim
(74) *Attorney, Agent, or Firm*—Foley & Lardner LLP

(57) ABSTRACT

In turning control apparatus and method for an automotive vehicle, the vehicle through at least one of a deceleration action section and a brake mechanism is decelerated when a turning state of the vehicle satisfies a predetermined condition, an accelerator manipulated variable by a vehicle driver is detected, and the deceleration through the brake mechanism is limited and the deceleration through the deceleration action section is carried out, when the detected accelerator manipulated variable exceeds a predetermined value ($\alpha$).

19 Claims, 11 Drawing Sheets

OTHER PUBLICATIONS

U.S. Appl. No. 11/143,573, filed Jun. 3, 2005, Ishimoto.
U.S. Appl. No. 11/144,610, filed Jun. 6, 2005, Higuchi et al.
U.S. Appl. No. 11/180,695, filed Jul. 14, 2005, Higuchi.
U.S. Appl. No. 11/138,312, filed May 27, 2005, Higuchi.
U.S. Appl. No. 11/143,573, filed Jun. 3, 2005, Ishimoto.
U.S. Appl. No. 11/144,610, filed Jun. 6, 2005, Higuchi et al.
U.S. Appl. No. 11/180,695, filed Jul. 14, 2005, Higuchi.

* cited by examiner

VEHICULAR TURNING CONTROL APPARATUS AND METHOD

BACKGROUND OF THE INVENTION

The present invention relates to vehicular turning control apparatus and method which achieve a stable turning of the vehicle.

A Japanese Patent No. 2600876 issued on Jan. 27, 1997 exemplifies a previously proposed turning control apparatus for an automotive vehicle. In the previously proposed vehicular turning control apparatus, an automatic deceleration of the vehicle is carried out in such a manner that a turning velocity and a radius of turn do not exceed respective limits on a turning performance of the vehicle so as to achieve a stable turning.

SUMMARY OF THE INVENTION

In the previously proposed vehicular turning control apparatus disclosed in the Japanese Patent, an automatic deceleration is carried out through a brake control and an engine control. However, specific techniques of the automatic deceleration through the brake control and the engine control are not disclosed. For example, in a case where the brake control causes an abrupt automatic braking force to be developed in a state where an accelerator pedal is depressed by a vehicle driver, an unpleasant feeling is given to the vehicle driver. An energy loss in vehicular driving and braking forces is developed by an interference of the driving force and the braking force.

It is, therefore, an object of the present invention to provide vehicular turning control apparatus and method which can suppress the unpleasant feeling given to the vehicle driver and can suppress the energy loss of the braking and driving forces.

According to one aspect of the present invention, there is provided with a turning control apparatus for an automotive vehicle, comprising: a drive source configured to develop a driving force in accordance with a driver's accelerator manipulation; a deceleration action section configured to apply a deceleration action to the vehicle, with the drive source driven by a driven side; a brake mechanism configured to apply a braking force to the vehicle; a traveling control section that decelerates the vehicle through at least one of the deceleration action section and the brake mechanism when the turning state of the vehicle satisfies a predetermined condition; a turning state detecting section configured to detect a turning state of the vehicle; and an accelerator manipulated variable detecting section configured to detect an accelerator manipulated variable by a vehicle driver, the traveling control section limiting the deceleration through the brake mechanism and carrying out the deceleration through the deceleration action section when the accelerator manipulated variable detected by the accelerator manipulated variable detecting section exceeds a predetermined value.

According to another aspect of the present invention, there is provided with a turning control method for an automotive vehicle, comprising: providing a drive source configured to develop a driving force in accordance with a driver's accelerator manipulation; providing a deceleration action section configured to apply a deceleration action to the vehicle, with the drive source driven by a driven side; providing a brake mechanism configured to apply a braking force to the vehicle; decelerating the vehicle through at least one of the deceleration action section and the brake mechanism when the turning state of the vehicle satisfies a predetermined condition; detecting a turning state of the vehicle; and detecting an accelerator manipulated variable by a vehicle driver; and limiting the deceleration through the brake mechanism and carrying out the deceleration through the deceleration action section when the detected accelerator manipulated variable exceeds a predetermined value.

This summary of the invention does not necessarily describe all necessary features so that the present invention may also be a sub-combination of these described features.

DETAILED DESCRIPTION OF THE INVENTION

Reference will hereinafter be made to the drawings in order to facilitate a better understanding of the present invention.

Figure 1:
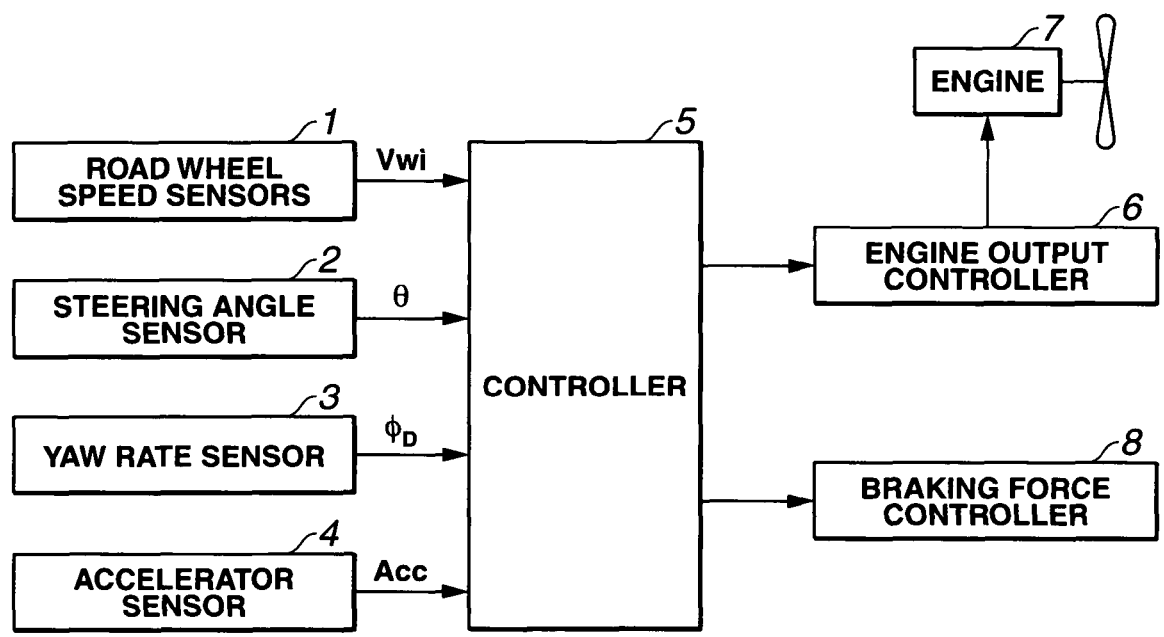
FIG. 1 is a block diagram representing a rough structure of a turning control apparatus according to the present invention.

FIG. 1 shows a block diagram representing a turning control apparatus according to the present invention. In FIG. 1, electromagnetic induction type road wheel speed sensors 1 to detect respective road wheel speeds Vwi (i=FL (a front left road wheel), FR (a front right road wheel), RL (a rear left road wheel), and RR (a rear right road wheel)), an optical, non-contact type steering wheel angle sensor 2 to detect a steering wheel steering angle θ of a steering wheel of the vehicle, a yaw rate sensor 3 to detect a yaw rate $\phi_D$ of a vehicle body, and an accelerator sensor 4 to detect an accelerator opening angle Acc of an accelerator pedal are connected to a controller 5. It is noted that an accelerator opening angle Acc corresponds to an accelerator manipulated variable.

Controller 5 is constituted by, for example, a microcomputer. A turning control procedure as will be described later is executed on the basis of a detection signal from each sensor shown in FIG. 1. An automatic deceleration in accordance with a turning state of the vehicle by drivingly control either one or both of an engine output controller 6 and a braking force controller 8 is carried out. It is noted that engine output controller 6 controls an engine output (an engine speed or an engine torque) by adjusting an opening angle of a throttle valve in an engine 7, a fuel injection quantity, and an ignition timing.

Figure 2:
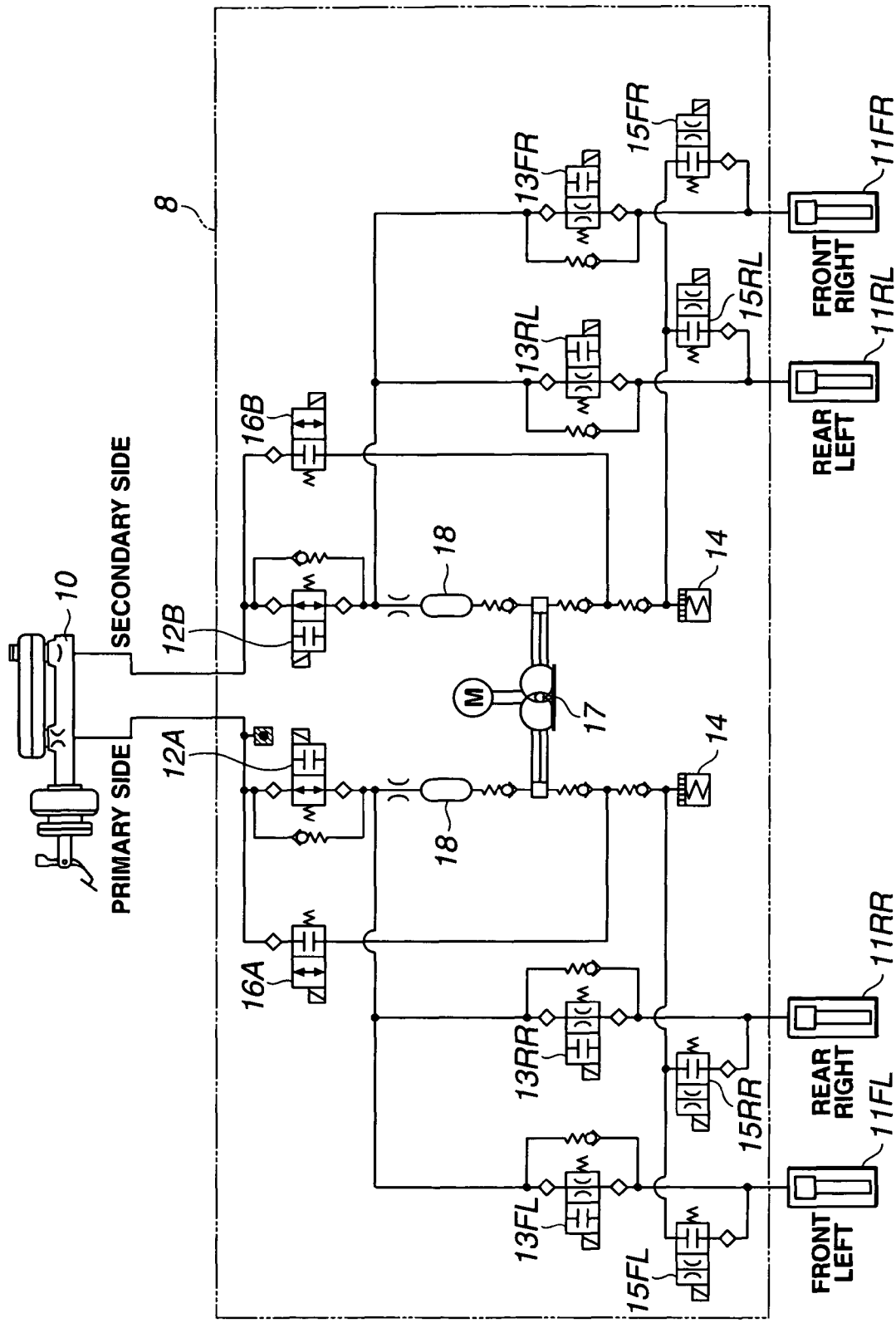
FIG. 2 is a rough hydraulic circuit connection diagram of a braking force controller.

In addition, braking force controller 8 is intervened between a master cylinder 10 and each wheel cylinder 11FL through 11RR, as shown in FIG. 2. Master cylinder 10 is a tandem type master cylinder which creates two system liquid pressures according to a depression force exerted by the vehicle driver on the accelerator pedal and adopts a diagonal split system in which the liquid pressure at a primary side thereof is transmitted to wheel cylinders 11FL, 11RR of front left and rear right road wheels and the liquid pressure at a secondary side is transmitted to wheel cylinders 11FR, 11RL of front right and rear left road wheels.

Each road wheel cylinder 11FL, 11FR, 11RL, 11RR is built in a disc brake in which a disc rotor is grasped by means of a brake pad under pressure to develop a braking force or in a drum brake in which a brake shoe is depressed under pressure on an inner peripheral surface of a brake drum to develop the braking force. Braking force controller 8 is a utilization of a braking fluid pressure control circuit used in an anti-skid control (ABS), a traction control (TCS), a stability control (VDC: Vehicle Dynamics Control), and so on and is configured so that the liquid pressure of each wheel cylinder 11FL, 11FR, 11RL, and 11RR can be increased, held, and decreased irrespective of a brake operation by the vehicle driver.

The primary side master cylinder 10 includes: a normally open type first gate valve 12A which is closable a flow passage between master cylinder 10 and wheel cylinder 11FL (or 11RR); a normally open type inlet valve 13FL (or 13RR) which is closable a flow passage between first gate valve 12A and wheel cylinder 11FL (or 11RR); an accumulator 14 communicated between wheel cylinder 11FL (or 11RR) and inlet valve 13FL (or 13RR); a normally closed type outlet valve 15FL (15RR) which is openable the flow passage between wheel cylinder 11FL (or 11RR) and accumulator 14; a normally closed type second gate valve 16A which is openable the flow passage between master cylinder 10 and first gate valve 12A and the flow passage between accumulator 14 and outlet valve 15FL (or 15RR); and a pump 17 whose suction side is communicated between accumulator 14 and outlet valve 15FL (or 15RR) and whose drain side is communicated between first gate valve 12A and inlet valve 13FL (or 13RR). A damper chamber 18 is disposed at the drain side of pump 17 to suppress a ripple of the drained brake liquid pressure and weaken a pedal vibration.

In addition, the secondary side of master cylinder 10 includes: a first gate valve 12B; inlet valve 13FR (or 13RL); accumulator 14; outlet valve 15FR (or 15RL); second gate valve 16B; pump 17; and damper chamber 18. First gate valves 12A, 12B, inlet valves 13FL, 13FR, 13RL, and 13RR, outlet valves 15FL through 15RR, and second gate valves 16A, 16B are electromagnetically operated valves of two-port-two-position switching, single solenoid, spring offset types, respectively. First gate valves 12A, 12B and inlet valves 13FR, 13FL, 13RL, and 13RR open the corresponding flow passages at normal positions when they are not excited and outlet valves 15FL, 15FR, 15RL, and 15RR and second gate valves 16A, 16B close the corresponding flow passages at the normal positions when they are not excited.

In addition, accumulator 14 is constituted by a spring type accumulator on which a compression spring is opposed against a piston of a corresponding cylinder. Pump 17 is constituted by a volume type pump which can secure a drainage quantity at substantially constant quantity irrespective of a load pressure such as a toothed gear pump, a vane pump, and a piston pump. In the above-described structure, an operation of the primary side of master cylinder 10 will be described below. When all of first gate valve 12A, inlet valves 13FL (or 13RR), outlet valve 15FL (or 15RR), and second gate valves 16A are at the normal positions when they are not excited, the liquid pressure from master cylinder 10 is directly transmitted to wheel cylinder 11FL (or 11RR) so that an ordinary (normal) braking occurs.

In addition, even though the brake pedal is not operated, with inlet valve 13FL (or 13RR), outlet valve 15FL (or 15RR), and second gate valve 16A at the normal positions when they are not excited, first gate valve 12A is closed, with first gate valve 12A excited and second gate valve 16A excited to be opened, and, furthermore, pump 17 is driven, the liquid pressure in master cylinder 10 is sucked through second gate valve 16A and the drained liquid pressure is transmitted to wheel cylinder 11FL (or 11RR) via inlet valve 13FL (or 13RR). Thus, the liquid pressure can be increased.

When first gate valve 12A, outlet valve 15FL (or 15RR), and second gate valve 16A are at the normal positions when they are not excited, inlet valve 13FL (or 13RR) is excited to be closed. At this time, the flow passages from wheel cylinder 11FL (or 11RR) to master cylinder 10 and to accumulator 14 are closed and the liquid pressure of wheel cylinder 11FL (or 11RR) is held.

Furthermore, when first gate valve 12A and second gate valve 16A are placed at the normal positions when they are not excited, inlet valve 13FL (or 13RR) is excited to be closed and outlet valve 15FL (or 15RR) is excited to be opened. At this time, the liquid pressure of wheel cylinder 11FL (or 11RR) is caused to be flowed into accumulator 14 and is decreased. The liquid pressure in accumulator 14 is sucked by means of pump 17 and is returned to master cylinder 10.

Concerning the secondary side of master cylinder 10, the operations of normal (ordinary) brake, pressure increase, hold, and pressure decrease are the same as those in the case of the primary side. The detailed explanation thereof will be omitted herein. Thus, controller 5 by drivingly controlling first gate valves 12A and 12B, inlet valves 13FL through 13RR, outlet valves 15FL through 15RR, second gate valves 16A, 16B, and pump 17 increases, holds, and decreases the liquid pressure in respective wheel cylinders 11FL through 11RR.

It is noted that, in the turning control apparatus according to the present invention, the diagonal split system is adopted in the brake system in which the brake system is split into two systems of the front left and rear right road wheel side and the front right and rear left road wheels. The present invention is not limited to this. Front and rear split systems in which the brake system is split into two systems of the front left and right road wheel side and the rear left and right road wheel side may be adopted. In addition, although, in the first preferred embodiment, spring type accumulator 14 is adopted, the present invention is not limited to this. The brake liquid drained from respective wheel cylinders 11FL through 11RR may temporarily store and carry out efficiently the pressure decrease. Accumulator 14 may be any type of a weight type, a gas compression direct pressure type, a piston type, a metallic bellows type, a diaphragm type, a plug type, and an in-line type.

In addition, in the first preferred embodiment, first gate valves 12A, 12B and inlet valves 13FL through 13RR open the flow passages at the normal position when they are not excited and outlet valves 15FL through 15RR and second gate valves 16A and 16B close the flow passages at the normal position when they are not excited. However, the present invention is not limited to this. In summary, since each valve closure and opening may be carried out, first gate valves 12A and 12B and inlet valves 13FL through 13RR may open the flow passages at their offset positions when they are excited and outlet valves 15FL through 15RR and second gate valves 16A and 16B may close the flow passage at the excited offset positions.

Figure 3:
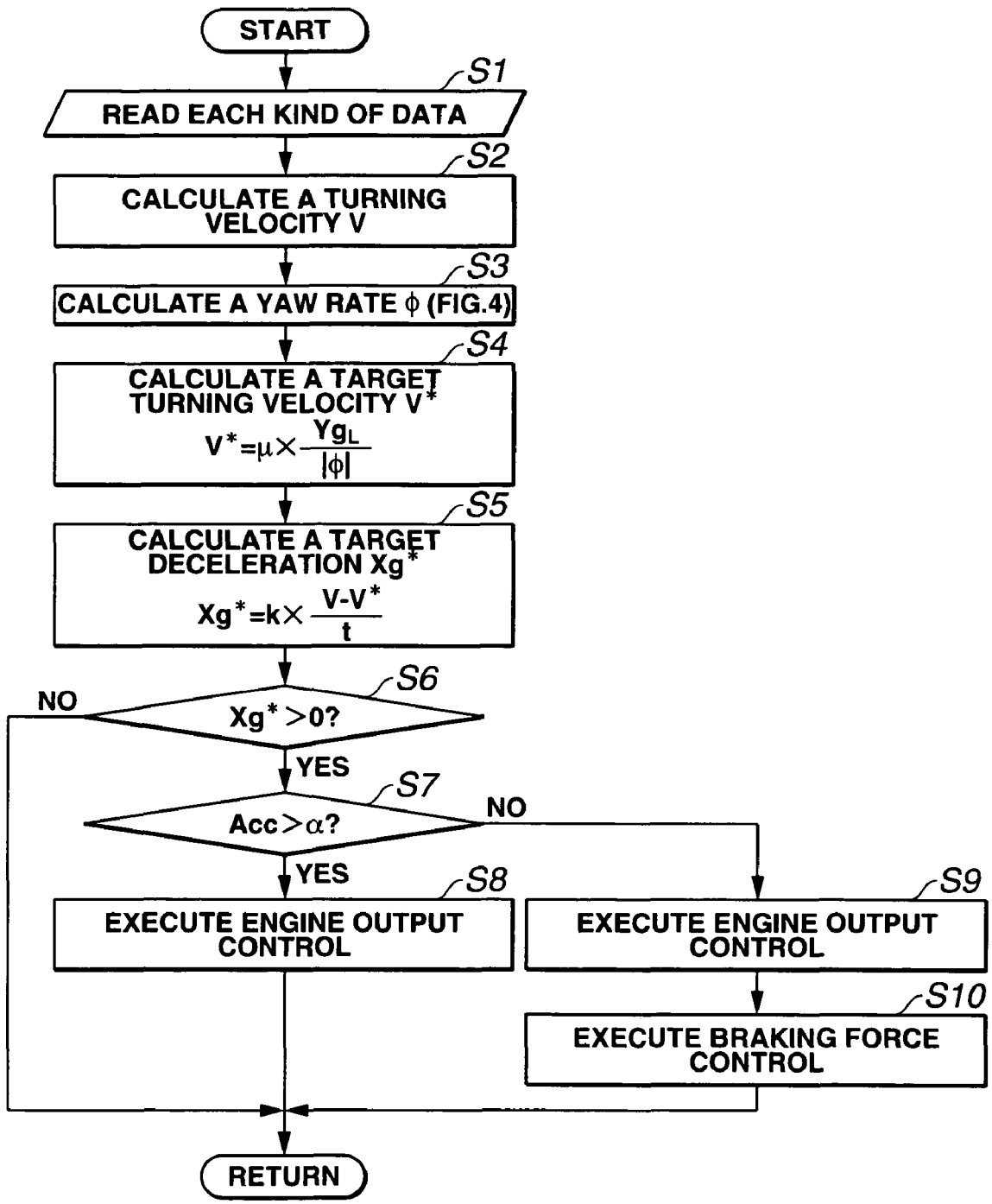
FIG. 3 is a control flowchart representing a turning control procedure executed by the turning control apparatus in a first preferred embodiment shown in FIG. 1.

Next, the turning control procedure executed by controller 5 will be described on the basis of a flowchart of FIG. 3. The turning control procedure is executed as a timer interrupt processing for each predetermined time (for example, 10 milliseconds). As shown in FIG. 3, controller 5 reads each road wheel speed Vwi, steering wheel steering angle θ, a yaw rate detection value $\phi_D$, and accelerator opening angle Acc.

Figure 4:
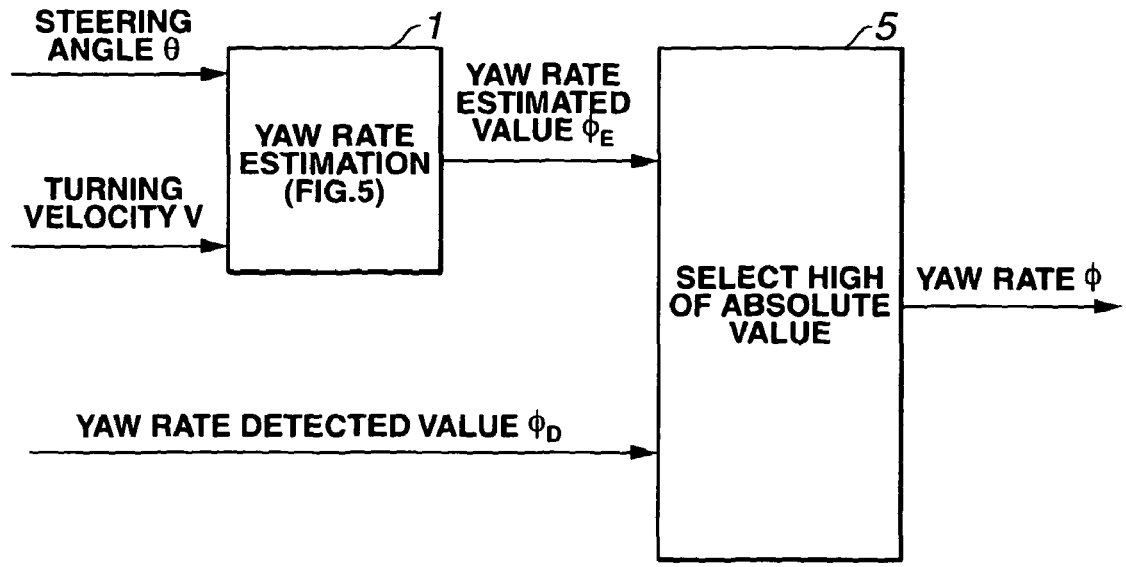
FIG. 4 is a block diagram used to represent a calculation procedure of a yaw rate.

At the subsequent step S2, controller 5 calculates turning velocity V on the basis of each road wheel velocity Vwi. It is noted that, in the first embodiment, turning velocity V is calculated on the basis of each road wheel velocity Vwi. The present invention is not limited to this. A forward-and-backward acceleration (longitudinal acceleration) of a vehicle body may be detected by means of an acceleration sensor and may calculate turning velocity V with the longitudinal acceleration in mind. At the subsequent step S3, controller 5 calculates a vehicular body yaw rate φ in accordance with a block diagram shown in FIG. 4.

Figure 5:
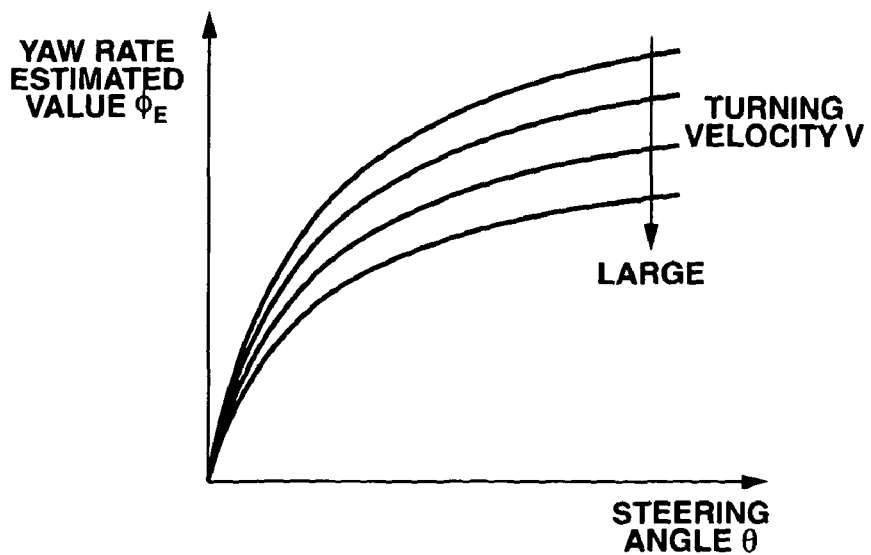
FIG. 5 is a control map representing a calculation of a yaw rate estimated value.

First, referring to a control map as shown in FIG. 5, controller 5 calculates a yaw rate estimated value $\phi_E$ in accordance with steering wheel steering angle θ and turning velocity V. It is noted that the control map used for the calculation of yaw rate estimated value $\phi_E$ is set in such a manner that, with a lateral axis as steering wheel steering angle θ and a longitudinal axis as yaw rate estimated value $\phi_E$, as steering wheel steering angle θ becomes increased, yaw rate $\phi_E$ is increased, a rate of this increase becoming smaller as turning velocity V becomes larger. Then, as shown in an equation (1), a select high between an absolute value of the yaw rate detected value $\phi_D$ and the absolute value of yaw rate estimated value $\phi_E$ calculates a final yaw rate φ. It is noted that a reason that the select high is carried out between the absolute values of yaw rate detection value $\phi_D$ and yaw rate estimated value $\phi_E$ is to be capable of intervening a deceleration control at an earlier timing, for example, in a slow spin mode in which yaw rate φ is increased although steering wheel steering angle θ is not so large under a road having a low road surface-and-tire frictional coefficient (also called, road surface frictional coefficient) μ.

$$\phi=\max[|\phi_D|,|\phi_E|] \quad (1)$$

At the subsequent step S4, controller 5 calculates target turning velocity V* with respect to the present turning state as shown in an equation (2). It is noted that μ denotes the road surface-and-tire frictional coefficient and is estimated on the basis of a slip rate and a brake manipulated variable (master cylinder pressure), is estimated on the basis of a road surface image data and an atmospheric temperature, is estimated on the basis of the detection result of road surface determination sensor (GVS: Ground View Sensor), or is retrieved from an infrastructure. In addition, $Yg_L$ denotes a limit lateral acceleration and is set to a predetermined value (for example, 0.45 G) at which the vehicle can stably be turned However, limit lateral acceleration $Yg_L$ may be varied in accordance with the slip rate for each road wheel.

$$V^*=\mu \times Y_{gL}/|\phi| \quad (2)$$

At the subsequent step S5, controller 5 calculates a target deceleration Xg* as denoted by the following equation (3). It is noted that ΔV denotes a deviation (V−V*) between turning velocity V and target turning velocity V*, t denotes a predetermined time, and k denotes a coefficient.

$$Xg^*=k \times \Delta V/t \quad (3)$$

It is noted that controller 5 calculates target deceleration Xg* on the basis of merely deviation ΔV between turning velocity V and target turning velocity V*. The present invention is not limited to this. As shown in the following equation (4), controller 5 may calculate target deceleration Xg* with a variation speed (a variation rate per unit time) dΔV in the increase direction of deviation ΔV as denoted by equation (4). It is noted that k1 and k2 denote coefficients. In addition, variation speed dΔV may be the variation rate per the calculation period or may be an average variation rate within the predetermined time.

$$Xg^*=(k1 \times \Delta V+k2 \times d \times V)/t \quad (4)$$

At subsequent step S6, controller 5 determines whether target deceleration Xg* is larger than 0. If the result of determination is Xg*≦0, controller 5 determines that the automatic deceleration is not necessary and returns to a predetermined main program. On the other hand, if the result of determination is Xg*>0, controller 5 determines that the automatic deceleration is necessary and the routine goes to a step S7. At step S7, controller 5 determines whether accelerator opening angle Acc is larger than a predetermined value α. It is noted that a symbol of predetermined value α denotes zero or a value to a degree such that the vehicle driver lightly depresses his foot on the accelerator pedal and controller 5 can determine that the vehicle driver has no intention to manipulate the acceleration operation. It is also noted that predetermined value α indicates, for example, 5% (a fully open state is 100% and a fully closed state is 0%). If this result of determination is Acc>α, controller 5 determines that the vehicle driver has the intention to make the accelerator operation, namely, determines that the vehicle driver has the acceleration intention and the routine goes to a step S8.

At step S8, controller 5 suppresses an engine output at engine output controller 6 by a suppression quantity to achieve target deceleration Xg* and affects the deceleration action on the vehicle with engine 7 in a state in which engine 7 is driven from a driven side (a road wheel side) namely applies an engine brake to the vehicle and returns to a predetermined program. On the other hand, if the result of determination at step S7 indicates that Acc≦α, controller 9 determines that the vehicle driver has no accelerator manipulation intention, namely, that the vehicle driver has no acceleration intention and the routine goes to a step S9 as will be described later.

At step S9, engine controller 5 suppresses the engine output by engine output controller 6 in order to achieve target deceleration Xg* and acts the engine brake on the vehicle.

At the subsequent step S10, controller 5 calculates the target value of each wheel cylinder pressure required to quickly achieve target deceleration Xg* and drivingly controls braking force control unit 8 in such a manner that the actual liquid pressure is made coincident with the target value so that a frictional brake is applied and the program returns to the predetermined main program.

It is noted that engine 7 corresponds to a drive source, engine output controller 6 corresponds to a deceleration acting section, and braking force controller 8 and wheel cylinders 11FL through 11RR correspond to the braking mechanism. In addition, the processing at step 52 corresponds to a turning state detecting section, the series of processes at steps S3 through S10 correspond to a traveling control section, and accelerator sensor 4 corresponds to an accelerator manipulated variable detecting section.

Next, actions and advantages of the first preferred embodiment will be described below. Suppose now that the vehicle is turning. At this time, since target deceleration Xg* is equal to or below zero (the determination at step S6 is "No"), the stable turning is maintained. Hence, controller 5 determines that it is not necessary to carry out the automatic deceleration. Then, engine output controller 6 is in the non drive state in such a manner that the ordinary engine output is resulted in accordance with the driver's acceleration manipulation and braking force controller 8 is set in the non-drive state in such a manner that the ordinary brake is applied in accordance with the brake compensation of the driver.

When target deceleration Xg* becomes larger than zero with the steering manipulated variable of the steering wheel by the vehicle driver increased or the accelerator manipulated variable of the vehicle driver increased (Yes at step S6), the turning state of the vehicle approaches to the limitation of the turning performance and controller 5 determines that it is necessary to perform the automatic deceleration.

At this time, since accelerator manipulated variable Acc is larger than predetermined value α ("Yes" at step S7), controller 5 determines that the driver has depressed the accelerator pedal and inhibits the frictional brake by means of braking force controller 8. Then, at step S8, the vehicle is decelerated only by means of the engine brake through engine output controller 6. Thus, the unpleasant feeling given to the driver in such a situation that, with the accelerator pedal depressed by the driver, the brake is abruptly applied by means of wheel cylinders 11FL through 11RR can be suppressed. In addition, in a state where the driving force developed by means of engine 7 in accordance with the driver's accelerator manipulated variable, the energy loss of the driving and braking forces when the wheel cylinders 11FL through 11RR apply the brake can be suppressed.

On the other hand, if accelerator opening angle Acc is equal to or smaller than predetermined value α (No at step S7), the controller 5 determines that the driver merely places his foot on the accelerator pedal. Then, at steps S9 and S10, controller 5 decelerates the vehicle through the engine brake by means of engine output controller 6 and through the frictional brake by means of the braking force controller 8. Thus, target deceleration Xg* can quickly be achieved and a safe deceleration can be improved.

As described above, the automatic deceleration only through the engine brake or the automatic deceleration through both of the engine brake and the frictional brake causes target deceleration Xg* to be equal to or smaller than zero so as to return to the stable turning enabled state. Then, both of engine output controller 6 and braking force controller 8 are again driven state and the automatic deceleration is ended. It is noted that, in the first preferred embodiment, the vehicle is decelerated only through the engine brake with the frictional brake inhibited. However, the present invention is not limited to this. That is to say, if a light frictional brake is applied, the unpleasant feeling is not given to the driver. Hence, the frictional brake is not inhibited but may be limited. That is to say, a minute frictional brake to such a degree that the vehicle driver does not feel that the deceleration is carried out may be adopted.

It is also noted that, in the first embodiment, when accelerator opening angle Acc is equal to or lower than predetermined value α, the vehicle is decelerated through both of the engine brake and the frictional brake. However, the present invention is not limited to this. That is to say, since it is possible for the vehicle to be decelerated sufficiently by only releasing this limitation from the state in which the frictional brake is limited, only the frictional brake may be used in place of the non-use of the engine brake.

In addition, in the above-described first embodiment, a hydraulic brake in which the liquid pressure is the transmission media has been adopted as the braking mechanism to apply the brake. The present invention is not limited to this. Any other braking mechanism utilizing cables, links, or atmospheric pressure as the transmission media may be adopted. Furthermore, in the first embodiment, the frictional brake which develops the braking force from a frictional resistance such as the disc rotor grasped under pressure by means of the brake pad, or the application of the depression force of a brake shoe onto an inner peripheral surface of the brake drum. However, the present invention is not limited to this. Any other braking mechanism such as an electromagnetic brake which develops the braking force through a magnetic force resistance, an aerial force brake to develop the braking force by means of an aerial resistance, a regenerative brake to develop the braking force through an electrical generation may be adopted.

In addition, although the deceleration action is obtained by suppressing the engine output in the first embodiment, the present invention is not limited to this. The deceleration action may be obtained by down shifting a gear ratio of a vehicular transmission to a speed reduction side. That is to say, any means may be used, with engine 7 driven from the driven side (road wheel side), if the deceleration action may be obtained with engine 7 as a resistance.

In the first embodiment, target deceleration Xg* may be calculated on the basis of deviation ΔV between turning velocity V and target turning velocity V* and when target deceleration Xg* is larger than 0, the automatic deceleration is carried out. However, the present invention is not limited to this. The automatic deceleration may be carried out when turning velocity v is larger than target turning velocity V*. In addition, not only the turning velocity but also the radius of turn and target turning radius are calculated and the automatic deceleration may be carried out when the radius of turn becomes smaller than a target turning radius. In summary, the automatic deceleration may be carried out so that the turning state of the vehicle does not exceed the limitation of the turning performance.

Figure 6:
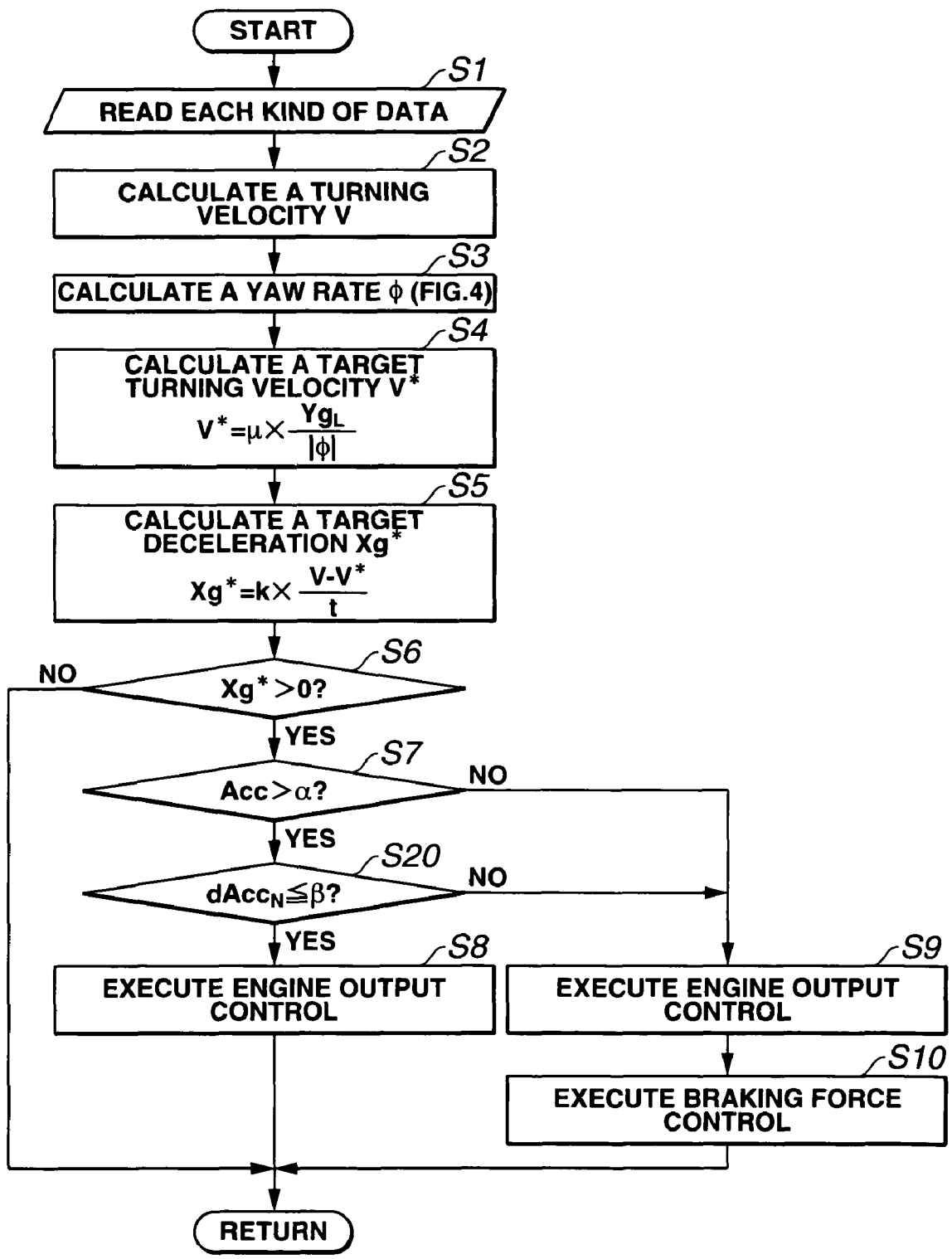
FIG. 6 is a flowchart representing a turning control procedure executed by the turning control apparatus in a second preferred embodiment according to the present invention.

Next, a second preferred embodiment of the present invention will be explained on the basis of FIG. 6. In this second embodiment, the automatic deceleration is carried out only through the engine brake or the automatic deceleration is carried out through both of the engine brake and frictional brake is determined with not only the accelerator manipulated variable Acc but also variation speed $dAcc_N$ in the decrease direction of accelerator manipulated variable Acc taken into consideration. That is to say, in the turning control procedure in the second embodiment, except an addition of a new step S20, the same processing as the turning control procedure shown in FIG. 3 is executed before the execution of the processing at step S8 in FIG. 3. Hence, parts corresponding to FIG. 3 attach the same reference numerals and the detailed description thereof will be omitted here.

At step S20 in FIG. 3, controller 5 determines whether variation speed $dAcc_N$ in the decrease direction is equal to or slower than a predetermined value β. It is noted that variation speed $dAcc_N$ has the positive value indicating the variation speed in the accelerator decrease direction and has the negative value indicating the variation speed in the accelerator increase direction and may be a variation quantity for each calculation period or may be an average variation quantity within the predetermined time. In addition, predetermined value β is set to a positive value and indicates, for example, 300%/sec. When the result of determination at step S20 is $dAcc_N \leq \beta$, controller 5 determines that the vehicle driver has the intention to manipulate the accelerator and the routine goes to step S8. On the other hand, if the result of determination is $dAcc_N > \beta$, controller 5 determines that the vehicle driver has the intention to decelerate the vehicle quickly and the routine goes to step S9.

it is noted that the process at step S20 constitutes a part of traveling control section. According to the second embodiment of the turning control apparatus, even when accelerator manipulated variable Acc exceeds predetermined value α, the brake pedal is released desiring the quick deceleration by the driver. At this time, the automatic deceleration using both of the engine brake and the frictional brake can decelerate the vehicle quickly. That is to say, such a situation that, due to the fact that the accelerator manipulated variable Acc exceeds predetermined value α even though the driver desires the quick deceleration, only the engine brake is acted can be avoided. Then, the deceleration intention of the driver can be reflected on the automatic deceleration with a quick response. The other action and advantages in the case of the second embodiment are the same as in the case of the first embodiment described above.

Next, a third preferred embodiment of the turning control apparatus will be described below. In the third embodiment, a magnitude of the deceleration action is varied in accordance with the magnitude of the accelerator opening angle Acc. That is to say, in the turning control procedure in the third embodiment, the process at step S8 shown in FIG. 3 is replaced with a new step S30. The other steps carried out in the third embodiment are the same as those shown in FIG. 6 in the second embodiment. Hence, the detailed description thereof will herein be omitted.

Figure 7:
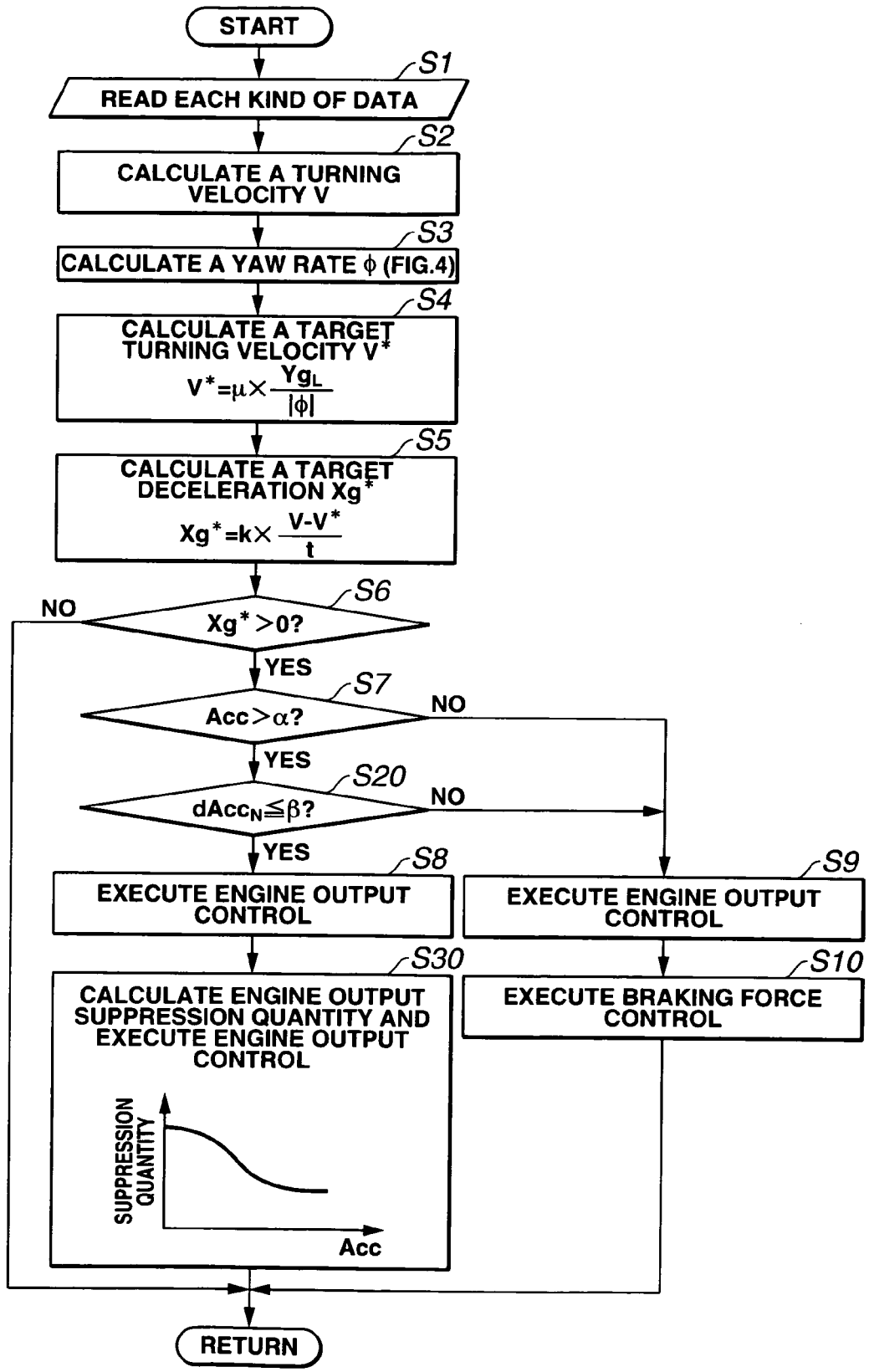
FIG. 7 is a flowchart representing a turning control procedure executed by the turning control apparatus in a third preferred embodiment according to the present invention.

At step S30, controller 5 refers to the control map as shown in the flowchart of FIG. 7. It is noted that the control map has the lateral axis taken along accelerator opening angle Acc and has the longitudinal axis taken along suppression quantity of the engine output and is set in such a manner that as accelerator opening angle Acc becomes larger, the suppression quantity of the engine output becomes decreased (smaller). Then, in accordance with the suppression quantity of the calculated engine output, the engine output is suppressed, the engine output is suppressed by engine output controller 6 so as to apply the engine brake to the vehicle. That is to say, a value of the subtraction of the above-described suppression quantity from the engine output commanded by a system in which an inter-vehicle distance control (ACC: Adaptive Cruise Control) or a vehicle speed control device (ASCD: Auto Speed Control Device) is executed or the engine output requiring the vehicle driver is a final engine output. It is noted that the process carried out at step S30 constitutes the part of the traveling control section.

According to the third preferred embodiment, when the vehicle is decelerated only by means of the engine brake, the engine output is not only uniformly suppressed but as accelerator opening angle Acc becomes smaller and the deceleration action makes smaller. Hence, when the accelerator pedal is largely depressed by the driver, the deceleration action can be reduced. Hence, the vehicle driver's intention to decelerate the vehicle can with high precision be reflected on the automatic deceleration.

In the third embodiment, the suppression quantity of the engine output is varied continuously unlimitedly in accordance with accelerator opening angle Acc. However, the present invention is not limited to this. The engine output suppression quantity may be varied in a stepwise manner in accordance with accelerator opening angle Acc or may be varied at one step. Furthermore, the suppression quantity of the engine output may be varied in a curved manner in accordance with accelerator opening angle. However, the present invention is not limited to this. The suppression quantity of the engine output may be varied linearly in accordance with the magnitude of accelerator opening angle Acc.

In the third embodiment, whenever the turning control procedure is executed, the suppression quantity of the engine output is calculated and the engine output is suppressed in accordance with the suppression quantity. However, the present invention is not limited to this. For example, with the suppression quantity when the automatic deceleration is carried out stored, the engine output may be suppressed in accordance with the stored suppression quantity until target deceleration Xg* is again returned to be equal to or lower than zero.

In addition, the deceleration action by means of the engine brake is varied in accordance with accelerator opening angle Acc only when the automatic deceleration is carried out only by means of the engine brake. The present invention is not limited to this. At step S9 at which the automatic deceleration using both of the engine brake and the frictional brake is carried out, the deceleration action due to the engine brake may be modified in accordance with the accelerator opening angle Acc. In addition, the third embodiment is based on the second embodiment but may be based on the first embodiment. The other action and advantages are the same as those described in the case of the second embodiment.

Figure 8:
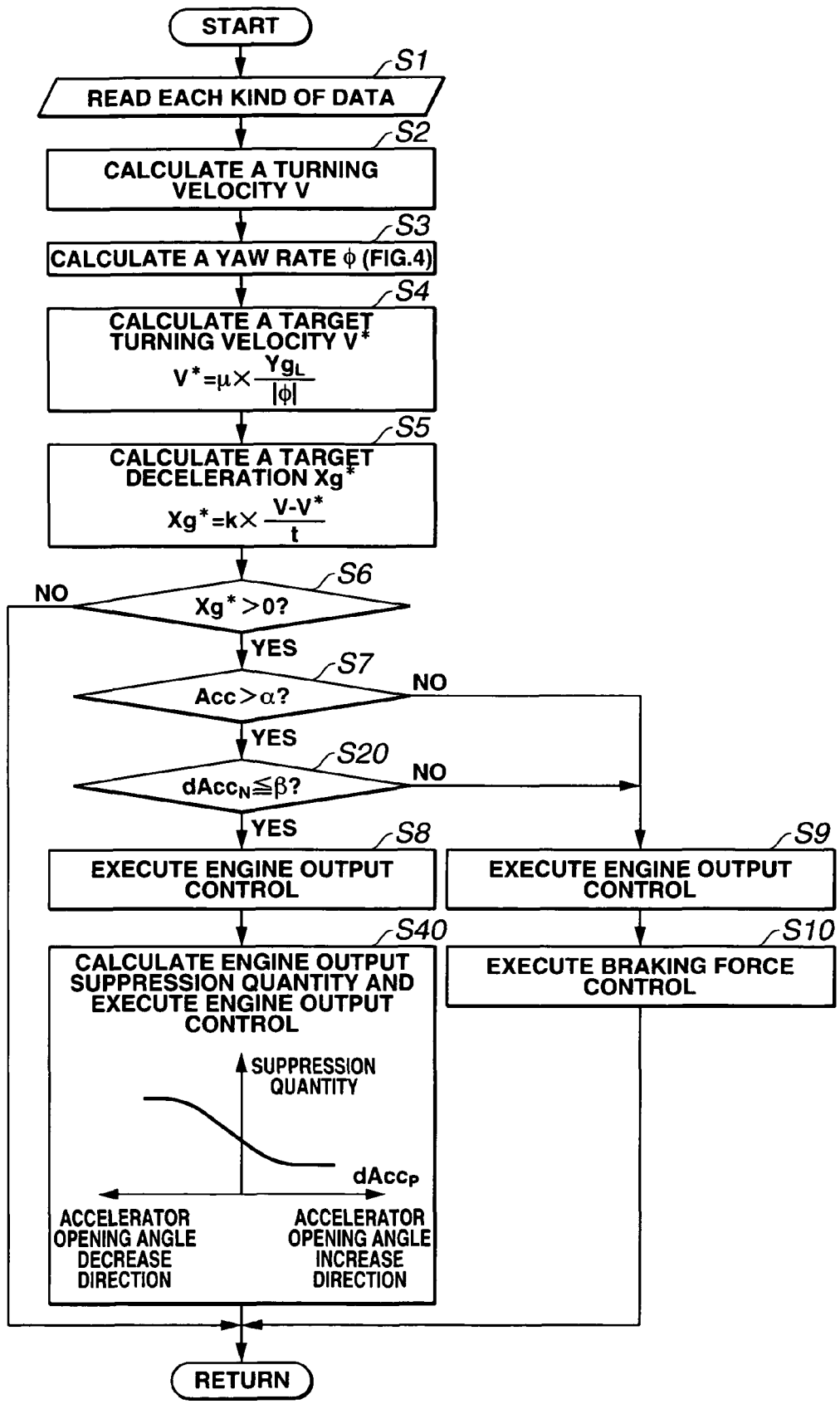
FIG. 8 is a flowchart representing a turning control procedure executed by the turning control apparatus in a fourth preferred embodiment according to the present invention.

Next, a fourth preferred embodiment of the turning control apparatus will be described below on the basis of FIG. 8. In the fourth embodiment, the magnitude of the deceleration action by means of the engine brake is varied in accordance with variation speed $dAcc_P$ in the increase direction of accelerator opening angle Acc. That is to say, in the turning control procedure in the fourth embodiment, except the modification of the process at step S30 shown in FIG. 7 to a new step S40 as shown in FIG. 8, the same processing as the turning control procedure is carried out. Hence, the detailed description thereof will omitted herein.

At step S40, controller 5 refers to the control map as shown in the flowchart of FIG. 8 and calculates the suppression quantity (throttling quantity) of the engine output in accordance with variation speed $dAcc_P$ in the increase direction. It is noted that the control map has the lateral axis taken along variation speed $dAcc_P$ in the increase direction and has the longitudinal axis taken along the suppression quantity of the engine output and is set in such a manner that, as the magnitude of variation speed $dAcc_P$ becomes larger, the suppression quantity of the engine output is decreased. It is noted that the positive value denotes the variation speed of the accelerator opening angle increase direction and the negative value denotes the variation speed in the accelerator opening angle decrease direction. Then, in accordance with the suppression quantity of the calculated engine output, the engine output is suppressed by engine output controller 6 and the engine brake is acted. The process at step S40 constitutes the part of the traveling control section.

According to the fourth embodiment of the turning control apparatus, when the vehicle is decelerated only by means of the engine brake, as variation speed $dAcc_P$ in the increase direction becomes larger, the suppression quantity of the engine output becomes smaller and the deceleration action is reduced. Hence, as a depression speed of the accelerator pedal becomes fast, the deceleration action can be reduced. Hence, the intention to reduce the vehicle speed by the driver can be reflected on the automatic deceleration with the high precision. The other action and advantages are the same as those described in the third embodiment.

Figure 9:
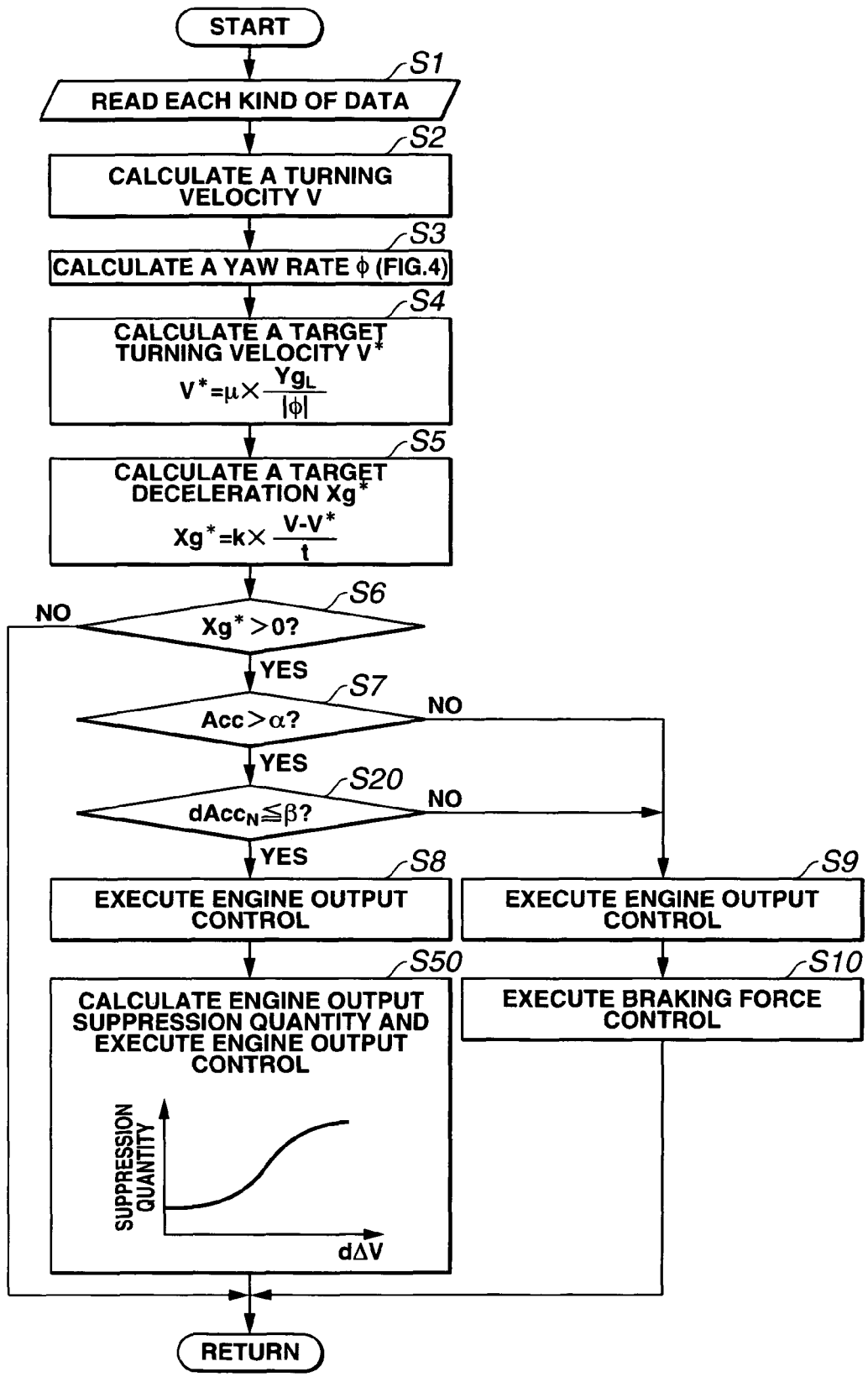
FIG. 9 is a flowchart representing a turning control procedure executed by the turning control apparatus in a fifth preferred embodiment according to the present invention.

Next, a fifth embodiment of the turning control apparatus according to the present invention will be described with reference to FIG. 9. In the fifth embodiment, the magnitude of the deceleration action by means of the engine brake is varied in accordance with variation speed d$\Delta$V toward the increase direction in the above-described deviation $\Delta$V. That is to say, in the turning control procedure in the fifth embodiment, the process at step S30 shown in FIG. 7 is modified to a new step S50 as shown in FIG. 9. The other steps as those shown in FIG. 7 designate the corresponding elements and the detailed description thereof will be omitted herein.

At step S50, controller 5 refers to the control map shown in the flowchart of FIG. 9 to calculate the suppression quantity (throttle quantity) in accordance with variation speed d$\Delta$V in the increase direction. The control map shown in the flowchart of FIG. 9 has the lateral axis taken along variation speed d$\Delta$V in the increase direction and has the longitudinal axis taken along the suppression quantity of the engine output. As variation speed d$\Delta$V becomes larger, the suppression quantity of the engine output becomes increased. The engine output is suppressed by means of engine output controller 6 in accordance with the suppression quantity of the calculated engine output to act the engine brake on the vehicle body. The process at step S50 constitutes the part of the traveling control section.

According to the fifth embodiment, when the vehicle is decelerated only by means of the engine brake, the engine output is not uniformly suppressed. This is because as variation speed d$\Delta$V in the increase direction becomes larger, the suppression quantity of the engine output becomes larger and the deceleration action becomes larger. This is because, as the increase speed of deviation $\Delta$V is large, the abrupt increase of target deceleration Xg* is expected. By increasing the deceleration action previously the abrupt change in the deceleration action is suppressed and the smooth automatic deceleration can be performed and speedily and sufficient automatic deceleration can be carried out only by means of the engine brake. The other actions and advantages are the same as those described in the third embodiment.

Figure 10:
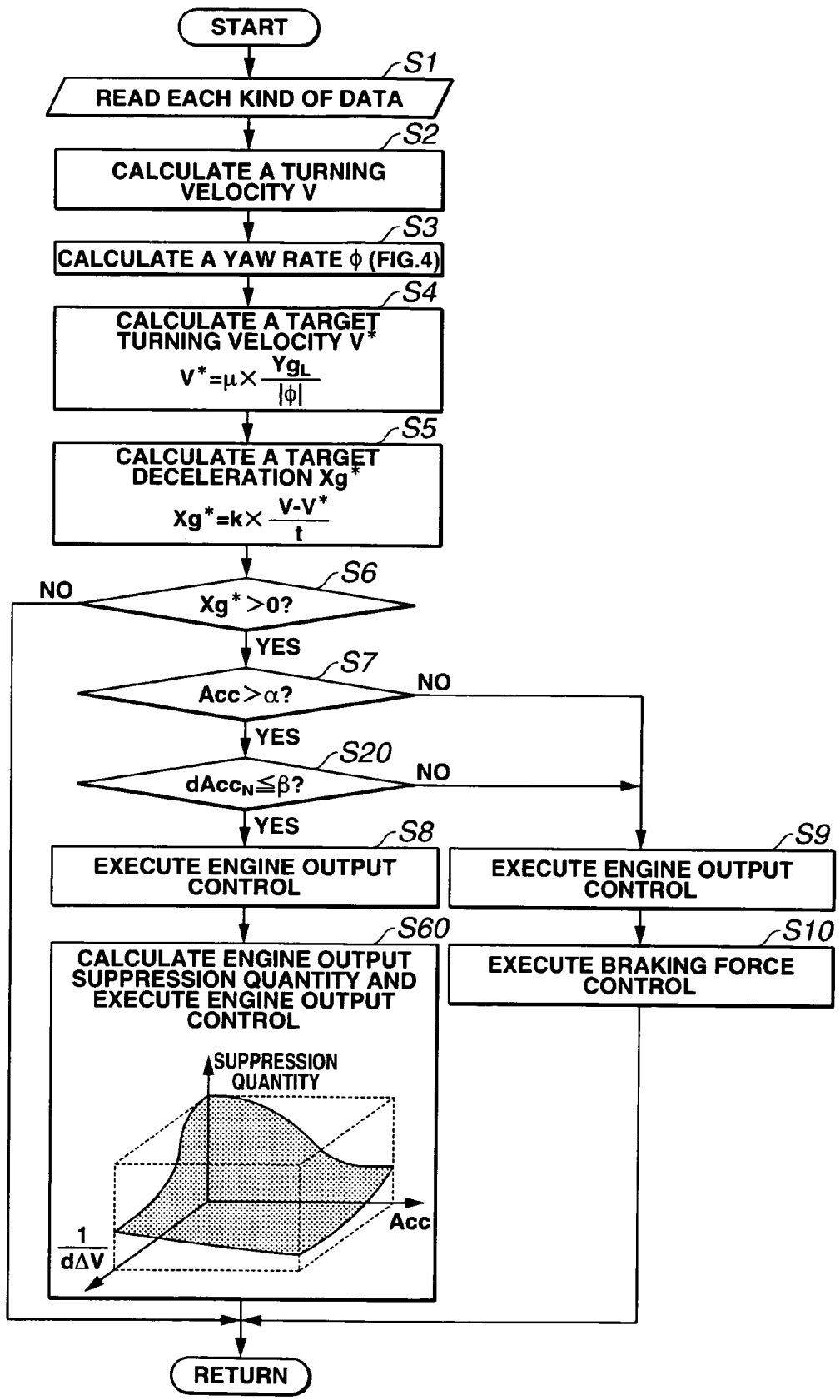
FIG. 10 is a flowchart representing a turning control procedure executed by the turning control apparatus in a sixth preferred embodiment according to the present invention.

Next, a sixth preferred embodiment of the turning control apparatus according to the present invention will be described below. In the sixth embodiment, the magnitude of the deceleration action by means of the engine brake is varied in accordance with accelerator opening angle Acc and an inverse number (the variation speed in the decrease direction) 1/d$\Delta$V of variation speed d$\Delta$V of deviation $\Delta$V in the increase direction. That is to say, in the turning control procedure in the sixth embodiment, except the modification of step S30 shown in FIG. 7 to a new step S60, the same processing as the turning control procedure shown in FIG. 10 is executed. Hence, the same reference numerals as those shown in shown in FIG. 7 are designated to like steps and the detailed description of the processes at the same steps will herein be omitted.

At step S60, controller 5 refers to the control map as shown in the flowchart in FIG. 10 to calculate the suppression quantity according to accelerator opening angle Acc and the inverse number 1/d$\Delta$V of variation speed d$\Delta$V of deviation $\Delta$V in the increase direction. The control map used at step S60 is a three-dimensional map whose lateral axis denotes accelerator opening angle Acc, longitudinal axis denotes the inverse number 1/d$\Delta$V, and whose height axis denotes the suppression quantity of the engine output. As accelerator opening angle Acc becomes larger and the inverse number of 1/d$\Delta$V becomes larger, the suppression quantity of the engine output is set to become smaller (decreased). In accordance with the calculated engine output suppression quantity, the engine output is suppressed by engine output controller 6 and the engine brake is acted. The processing of step S60 constitutes the part of the traveling control section.

According to the sixth embodiment, when the vehicle is decelerated only by means of the engine brake, the engine output is not uniformly suppressed but as accelerator opening angle Acc becomes larger and as deceleration speed (1/d$\Delta$V) of deviation $\Delta$V becomes larger, the deceleration action is made small. Hence, as the driver depresses the accelerator pedal largely, the deceleration action can be reduced. The intention of the driver to decelerate the vehicle can be reflected on the automatic deceleration with the high precision. In addition, when the decrease speed of deviation $\Delta$V is large, the speedy deceleration of target deceleration Xg* is expected. Hence, since the deceleration action is previously reduced, the abrupt change in the deceleration action is suppressed and the smooth automatic deceleration can be carried out. The other actions and advantages are the same as those described in the third embodiment.

Figure 11:
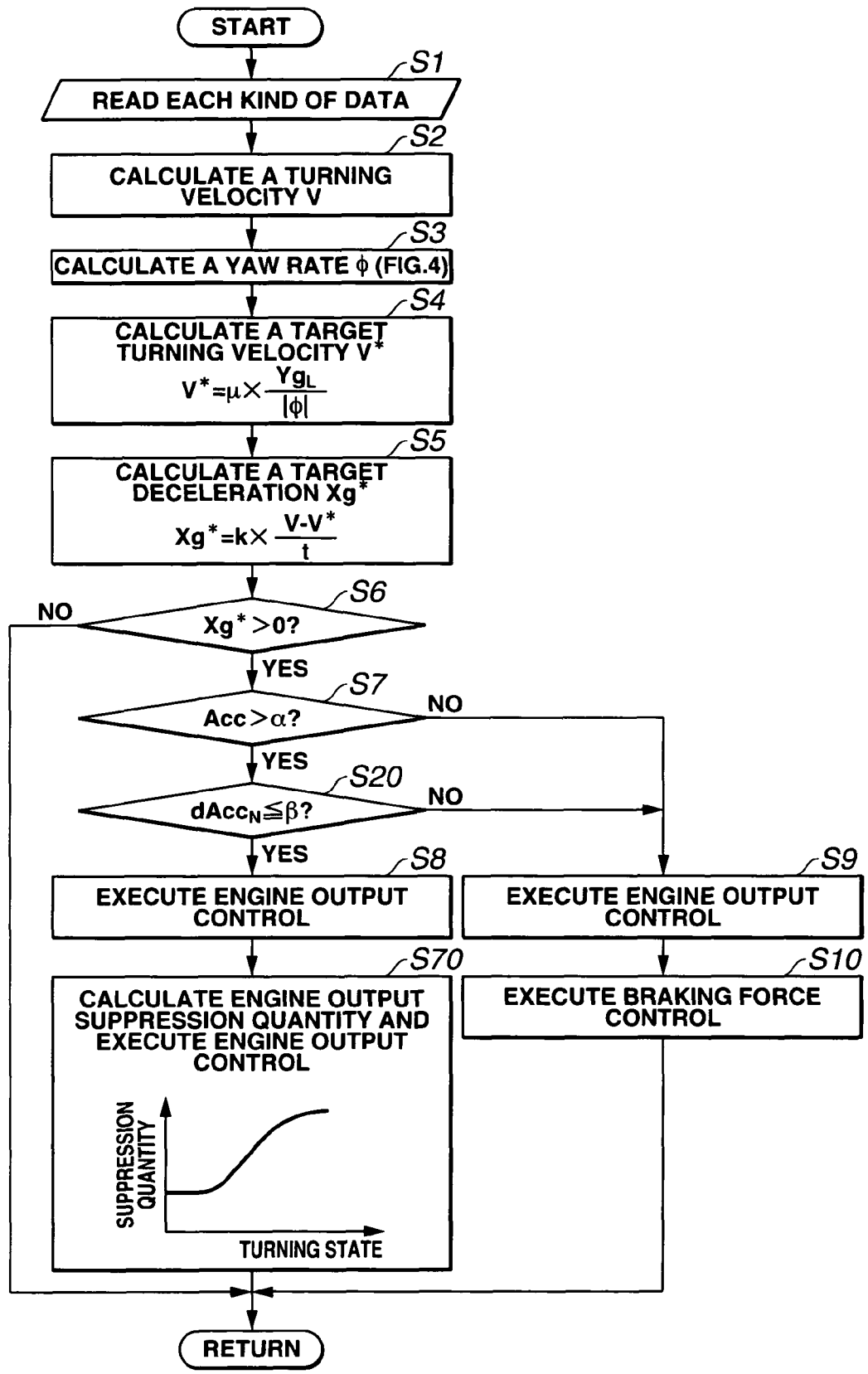
FIG. 11 is a flowchart representing a turning control procedure executed by the turning control apparatus in a seventh preferred embodiment according to the present invention.

Next, a seventh preferred embodiment of the turning control apparatus according to the present invention will be described with reference to FIG. 11. in the seventh embodiment, the magnitude of the deceleration action by means of the engine brake is varied according to the turning state of the vehicle. That is to say, in the turning control procedure in the seventh embodiment, except a modification of the process of step S30 shown in FIG. 7 to a new step S70 as shown in FIG. 11, the turning control apparatus in the seventh embodiment executes the same turning control procedure shown in FIG. 7. Hence, the same reference steps as those shown in FIG. 7 are designated by the like reference numerals and the detailed description thereof will herein be omitted.

In details, at step S70, controller 5 refers to the control map as shown in the flowchart shown in FIG. 11 to calculate the suppression quantity (throttling quantity) according to the parameters indicating the turning state, viz., yaw rate $\phi$, lateral acceleration Yg, and steering angle $\theta$. The control map has the lateral axis taken along the turning state and the longitudinal axis taken along the engine output suppression quantity. As the turning state becomes nearer to the limit of the turning performance, namely, as yaw rate $\phi$), lateral acceleration Yg, and steering angle $\theta$ become larger, the suppression quantity of the engine output becomes larger (increased). Then, in accordance with the suppression quantity of the calculated engine output, the engine output is suppressed by engine output controller 6 to apply the engine brake to the vehicle. It is noted that the process at step S70 constitutes the part of traveling control apparatus.

In the seventh preferred embodiment, when the vehicle is decelerated only by means of the engine brake, the engine output is not uniformly suppressed. As the turning state becomes nearer to the limitation (limit) of the turning performance, the suppression quantity of the engine output becomes larger and the deceleration action is enlarged. Hence, even if accelerator opening angle Acc of the driver is approximately constant, the turning state of the vehicle becomes nearer to the limitation of the turning performance due to the increase in the steering manipulated variable. Even in such a situation as described above, only the engine brake can perform the quick and speedy automatic deceleration.

It is noted that the magnitude of the deceleration action is modified only by means of the engine brake, in the seventh embodiment. The present invention is not limited to this. The magnitude of the deceleration action by means of the engine brake may be modified in accordance with the variation speed in the increase direction of the parameters such as yaw rate $\phi$, lateral acceleration Yg, and the steering wheel steering angle θ. The other actions and advantages are the same as those described in the third embodiment.

Next, an eighth preferred embodiment of the turning control apparatus according to the present invention will be described on the basis of FIG. 12. In the eighth embodiment, the magnitude of the deceleration action by means of the engine brake is varied in accordance with road surface-and-tire frictional coefficient μ. That is to say, in the turning control procedure in the eighth embodiment, except the modification of the process at step S30 shown in FIG. 7 to a new step S80 shown in FIG. 12, the turning control apparatus executes the same processing as the turning control procedure shown in FIG. 7. Hence, the same reference number steps as those shown in FIG. 7 are the same contents of steps. The detailed description thereof will be omitted herein.

Figure 12:
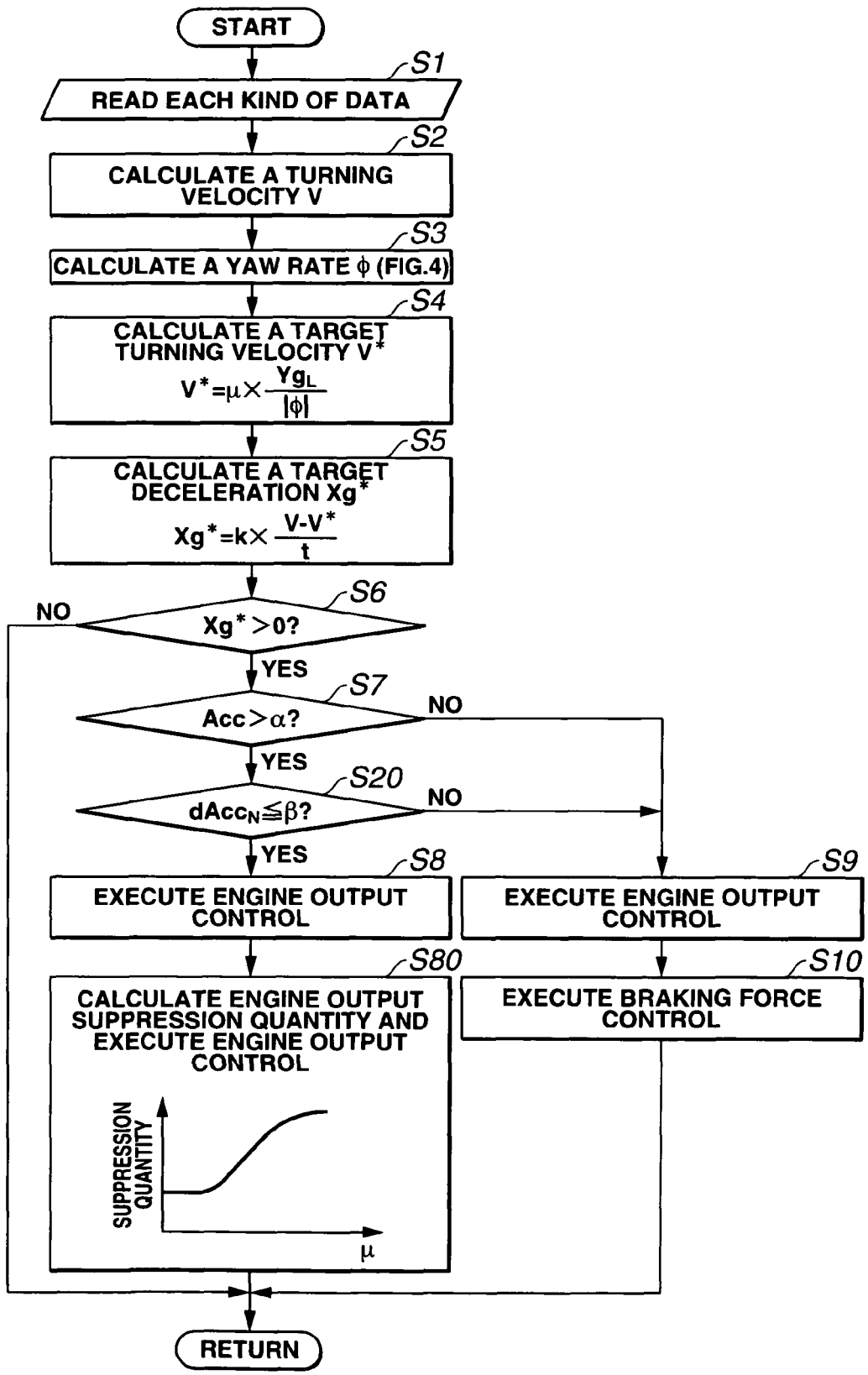
FIG. 12 is a flowchart representing a turning control procedure executed by the turning control apparatus in an eighth preferred embodiment according to the present invention.

At step S80, controller 5 refers to the control map shown in the flowchart of FIG. 12 to calculate the suppression quantity (throttling) quantity of the engine output in accordance with road surface-and-tire frictional coefficient μ. The control map has the lateral axis taken along road surface-and-tire frictional coefficient μ and longitudinal axis taken along the suppression quantity of the engine output. As road surface-and-tire frictional coefficient μ becomes smaller (becomes lower), the suppression quantity of the engine output is decreased (made smaller). The engine output is suppressed by means of engine output controller 6 in accordance with the calculated engine output suppression quantity and the engine brake is acted. The process at step S80 constitutes the part of traveling control section.

According to the eighth embodiment, when the vehicle is decelerated, the engine output is not uniformly suppressed. As road surface-and-tire frictional coefficient μ becomes smaller (lower), the suppression quantity of the engine output is reduced (made smaller) and the deceleration action is reduced. Hence, when the vehicle is traveling on the road having βlow road surface-and-tire frictional coefficient β, the effect of the large deceleration action on the vehicle can be avoided. Thus, the moderate automatic deceleration to prevent the worsening of the vehicular motion can be carried out. It is noted that, in the eighth embodiment, the suppression quantity of the engine output is varied in non-linearly in accordance with road surface-and-tire frictional coefficient μ. However, the present invention is not limited to this. The suppression quantity of the engine output may be varied linearly in accordance with road surface-and-tire frictional coefficient μ. The other actions and advantages are the same as those described in the third embodiment.

It is noted that the magnitude of the deceleration action by means of the engine brake is modified in accordance with accelerator opening angle Acc, variation speed dAcc of accelerator opening angle Acc, variation speed dΔV of deviation ΔV, the turning state of the vehicle, and road surface-and-tire frictional coefficient μ. However, the present invention is not limited to this. In other words, the magnitude of the deceleration action may be modified by a combination of any kinds of parameters. For example, a correction coefficient in accordance with respective kinds of parameters may be calculated and this correction coefficient may be multiplied with a reference value of the engine output suppression quantity to calculate the final suppression quantity of the engine output.

This application is based on a prior Japanese Patent Application No. 2004-344388 filed in Japan on Nov. 29, 2004, the disclosure of which is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A turning control apparatus for an automotive vehicle, comprising:
    a drive source configured to develop a driving force in accordance with a driver's accelerator manipulation;
    a deceleration action section configured to apply a deceleration action to the vehicle, with the drive source driven by a driven side;
    a brake mechanism configured to apply a braking force to the vehicle;
    a turning state detecting section configured to detect a turning state of the vehicle;
    a traveling control section configured to calculate a target turning state of the vehicle, and configured to decelerate the vehicle by controlling at least one of the deceleration action section and the brake mechanism when the turning state of the vehicle detected by the turning state detecting section satisfies a condition that a deviation is present between the detected turning state and calculated target turning state of the vehicle; and
    an accelerator manipulated variable detecting section configured to detect an accelerator manipulated variable by a vehicle driver, the traveling control section configured to control the brake mechanism to limit the deceleration through the brake mechanism, and configured to control the deceleration action section to carry out the deceleration through the deceleration action section when the accelerator manipulated variable detected by the accelerator manipulated variable detecting section exceeds a value such that the accelerator has been determined to be manipulated by the driver.

2. The turning control apparatus for the automotive vehicle as claimed in claim 1, wherein the traveling control section is configured to control the brake mechanism to be released when the accelerator manipulated variable exceeds the value that the accelerator has been determined to be manipulated by the driver and when a variation speed of the accelerator manipulated variable in a decrease direction exceeds a value such that the vehicle is intended to be decelerated quickly.

3. The turning control apparatus for the automotive vehicle as claimed in claim 1, wherein the traveling control section is configured to make the deceleration action by means of the deceleration action section smaller as the accelerator manipulated variable detected by the accelerator manipulated variable detecting section becomes larger.

4. The turning control apparatus for the automotive vehicle as claimed in claim 1, wherein the traveling control section makes the deceleration action through the deceleration action section smaller as a variation speed of the accelerator manipulated variable in an increase direction becomes larger.

5. The turning control apparatus for the automotive vehicle as claimed in claim 1, wherein the traveling control section calculates a target turning state of the vehicle and makes the deceleration action through the deceleration action section larger as a variation speed of a deviation between the calculated target turning state and the turning state detected by the turning state detecting section in an increase direction becomes larger.

6. The turning control apparatus for the automotive vehicle as claimed in claim 1, wherein the traveling control section makes the deceleration action through the deceleration action section larger, as the turning state of the vehicle becomes nearer to a limit of a turning performance of the vehicle.

7. The turning control apparatus for the automotive vehicle as claimed in claim 1, wherein the traveling control section makes the deceleration action through the deceleration action section smaller as a road surface-and-tire frictional coefficient becomes lower.

8. The turning control apparatus for the automotive vehicle as claimed in claim 1, wherein the traveling control section calculates a target turning state and makes the deceleration action by means of the deceleration action section smaller as the accelerator manipulated variable becomes larger and as a decrease speed of a deviation between the calculated target turning state and the turning state detected by the turning state detecting section becomes larger.

9. The turning control apparatus for the automotive vehicle as claimed in claim 1, wherein the turning state detecting section comprises a turning velocity calculating section configured to calculate a turning velocity of the vehicle on the basis of each road wheel speed and the traveling control section comprises a yaw rate calculating section configured to calculate a yaw rate; a target turning velocity calculating section configured to calculate a target turning velocity on the basis of the calculated yaw rate, a road surface-and-tire frictional coefficient, and a limit lateral acceleration; a target deceleration calculating section configured to calculate a target deceleration on the basis of a deviation between the calculated turning velocity and the target turning velocity; an automatic brake determining section configured to determine whether the target deceleration is larger than zero to determine an automatic brake; and a first deceleration executing section configured to execute the automatic brake only through an engine brake when the target deceleration is larger than zero and the detected accelerator manipulated variable is in excess of the value that the accelerator has been determined to be manipulated by the driver.

10. The turning control apparatus for the automotive vehicle as claimed in claim 9, wherein the traveling control section further comprises a second deceleration executing section configured to execute the automatic brake through both of the engine and through the brake mechanism when the target deceleration is larger than zero and the accelerator manipulated variable is equal to or smaller than the predetermined value.

11. The turning control apparatus for the automotive vehicle as claimed in claim 9, wherein the traveling control section further comprises an acceleration manipulated variable variation speed determining section configured to determine whether an accelerator manipulated variable variation speed in a decrease direction is equal to or smaller than a value such that the vehicle is intended to be decelerated quickly and wherein the first deceleration executing section is configured to execute the automatic brake through the engine brake when the target deceleration is larger than zero, the accelerator manipulated variable is in excess of the value such that the accelerator has been determined to be manipulated by the driver, and the accelerator manipulated variable variation speed in the decrease direction is equal to or smaller than the value such that the vehicle is intended to be decelerated quickly.

12. The turning control apparatus for the automotive vehicle as claimed in claim 11, wherein, as the accelerator manipulated variable detected by the accelerator manipulated variable detecting section becomes larger, the first deceleration executing section is configured to make a suppression quantity of an engine output smaller to make the deceleration action through the engine smaller.

13. The turning control apparatus for the automotive vehicle as claimed in claim 11, wherein, as a variation speed of the accelerator manipulated variable in an increase direction becomes larger, the first deceleration executing section makes a suppression quantity of an engine output smaller to make the deceleration action through the engine smaller.

14. The turning control apparatus for the automotive vehicle as claimed in claim 11, wherein, as a variation speed of a deviation between the turning velocity and the target turning velocity in an increase direction becomes larger, the first deceleration executing section makes a suppression quantity of an engine output larger to make the deceleration action through the engine brake larger.

15. The turning control apparatus for the automotive vehicle as claimed in claim 11, wherein, as a vehicle turning state becomes nearer to a limit of a turning performance of the vehicle, the first deceleration executing section makes a suppression quantity of an engine output larger to make the deceleration action through an engine brake larger.

16. The turning control apparatus for the automotive vehicle as claimed in claim 11, wherein, as a road-surface-and-tire frictional coefficient becomes lower, the first deceleration executing section makes a suppression quantity of an engine output smaller to make the deceleration action through an engine brake smaller.

17. The turning control apparatus for the automotive vehicle as claimed in claim 11, wherein, as the accelerator manipulated variable becomes larger and a variation speed of a deviation between the turning velocity and the target turning velocity in a decrease direction becomes larger, the first deceleration executing section makes a suppression quantity of an engine output smaller to make a deceleration action through an engine brake smaller.

18. The turning control apparatus for the automotive vehicle as claimed in claim 9, wherein the target deceleration calculating section is configured to calculate the target deceleration on the basis of the deviation and a variation speed of the deviation in an increase direction.

19. A turning control apparatus for an automotive vehicle, comprising:
    drive source means configured to develop a driving force in accordance with a driver's accelerator manipulation;
    deceleration action means for applying a deceleration action of the vehicle, with the drive source means driven by a driven side;
    a brake mechanism for applying a braking force to the vehicle;
    turning state detecting means for detecting a turning state of the vehicle;
    traveling control means for calculating a target turning state of the vehicle, and decelerating the vehicle by controlling at least one of the deceleration action means and the brake mechanism when the turning state of the vehicle detected by the turning state detecting means satisfies a condition that a deviation is present between the detected turning state and calculated target turning state of the vehicle; and
    accelerator manipulated variable detecting means for detecting an accelerator manipulated variable by a vehicle driver, the traveling control means controlling the brake mechanism to limit the deceleration through the brake mechanism and controlling the deceleration action means to carry out the deceleration through the deceleration action means when the accelerator manipulated variable detected by the accelerator manipulated variable detecting means exceeds a value such that the accelerator has been determined to be manipulated by the driver.

* * * * *